United States Patent
Akl et al.

(10) Patent No.: US 11,576,137 B2
(45) Date of Patent: Feb. 7, 2023

(54) SYNCHRONIZATION SIGNAL BLOCK (SSB) CONFIGURATION FOR POWER MANAGEMENT

(71) Applicant: QUALCOMM Incorporated, San Diego, CA (US)

(72) Inventors: Naeem Akl, Somerville, NJ (US); Navid Abedini, Somerset, NJ (US); Jianghong Luo, Skillman, NJ (US); Luca Blessent, Whitehouse Station, NJ (US); Karl Georg Hampel, Hoboken, NJ (US); Junyi Li, Chester, NJ (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/104,080

(22) Filed: Nov. 25, 2020

(65) Prior Publication Data

US 2021/0204235 A1 Jul. 1, 2021

Related U.S. Application Data

(60) Provisional application No. 62/955,262, filed on Dec. 30, 2019.

(51) Int. Cl.
*H04W 72/04* (2009.01)
*H04W 56/00* (2009.01)
(Continued)

(52) U.S. Cl.
CPC ....... *H04W 56/003* (2013.01); *H04W 56/001* (2013.01); *H04W 72/0426* (2013.01);
(Continued)

(58) Field of Classification Search
None
See application file for complete search history.

(56) References Cited

U.S. PATENT DOCUMENTS

2021/0153189 A1* 5/2021 Jo ...................... H04W 72/0453
2021/0218484 A1* 7/2021 Yuan .................... H04W 24/10

OTHER PUBLICATIONS

Huawei, et al., "SSB-Based Discovery and Measurement for IAB", 3GPP Draft, R1-1903936, 3GPP TSG RAN WG1 Meeting #96bis, 3RD Generation Partnership Project (3GPP), Mobile Competence Centre, 650, Route Des Lucioles, F-06921 Sophia-Antipolis Cedex, France vol. RAN WG1, No. Xi'an, China, Apr. 8, 2019-Apr. 12, 2019, Apr. 7, 2019 (Apr. 7, 2019), XP051699369, 6 Pages, Retrieved from the Internet: URL:http://www.3gpp.org/ftp/Meetings%5F3GPP%5FSYNC/RAN1/Docs/R1%2D1903936%2Ezip, [retrieved on Apt. 7, 2019] the Whole Document.
(Continued)

*Primary Examiner* — Willie J Daniel, Jr.
(74) *Attorney, Agent, or Firm* — Patterson & Sheridan, L.L.P

(57) ABSTRACT

Aspects of the present disclosure provide techniques for interference measurements based on a priority value in a network (e.g., an Integrated Access and Backhaul (IAB) network). One example method generally includes determining, based on a priority level associated with each of a first wireless node, a second wireless node, or both, at least one configuration for communicating one or more synchronization signal blocks (SSBs) between the first wireless node and the second wireless node, each of the first wireless node and the second wireless node being configured to serve one or more child nodes, wherein the at least one configuration comprises information enabling the first wireless node or the second wireless node to manage interference to communications. In some aspects, the method may also include
(Continued)

transmitting the at least one configuration to at least one of the first wireless node or the second wireless node.

29 Claims, 11 Drawing Sheets

(51) Int. Cl.
*H04W 72/08* (2009.01)
*H04W 88/14* (2009.01)
*H04W 72/10* (2009.01)

(52) U.S. Cl.
CPC ..... *H04W 72/0453* (2013.01); *H04W 72/082* (2013.01); *H04W 72/10* (2013.01); *H04W 88/14* (2013.01)

(56) References Cited

OTHER PUBLICATIONS

International Search Report and Written Opinion—PCT/US2020/062465—ISA/EPO—dated Mar. 18, 2021.

\* cited by examiner

SYNCHRONIZATION SIGNAL BLOCK (SSB) CONFIGURATION FOR POWER MANAGEMENT

CROSS-REFERENCE TO RELATED APPLICATION

This application claims benefit of and priority to U.S. Provisional Application No. 62/955,262, filed on Dec. 30, 2019, which is hereby assigned to the assignee hereof and hereby expressly incorporated by reference herein in its entirety as if fully set forth below and for all applicable purposes.

INTRODUCTION

Aspects of the present disclosure relate to wireless communications, and more particularly, to techniques for power management in an Integrated Access and Backhaul (IAB) network or other type of network.

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more DUs, in communication with a CU, may define an access node (e.g., which may be referred to as a BS, next generation NodeB (gNB or gNodeB), TRP, etc.). A BS or DU may communicate with a set of UEs on downlink channels (e.g., for transmissions from a BS or DU to a UE) and uplink channels (e.g., for transmissions from a UE to a BS or DU).

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

As the demand for mobile broadband access continues to increase, further improvements in NR and LTE technology continue to be useful. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between wireless communication devices.

Certain aspects provide a method for wireless communication. The method generally includes: determining, based on a priority level associated with each of a first wireless node, a second wireless node, or both, at least one configuration for communicating one or more synchronization signal blocks (SSBs) between the first wireless node and the second wireless node, each of the first wireless node and the second wireless node being configured to serve one or more child nodes, wherein the at least one configuration comprises information enabling the first wireless node or the second wireless node to manage interference to communications; and transmitting the at least one configuration to at least one of the first wireless node or the second wireless node.

Certain aspects provide a method for wireless communication. The method generally includes: receiving, at a first wireless node, at least one configuration for communicating of one or more synchronization signal blocks (SSBs) between the first wireless node and a second wireless node, each of the first wireless node and the second wireless node being configured to serve one or more child nodes; and managing interference to communications via the one or more SSBs based on at least one priority level associated with the first wireless node, the second wireless node, or both, the communications being by the first wireless node or the second wireless node.

Certain aspects provide an apparatus for wireless communication. The apparatus generally includes: a processing system configured to determine, based on a priority level associated with each of a first wireless node, a second wireless node, or both, at least one configuration for communicating one or more synchronization signal blocks (SSBs) between the first wireless node and the second wireless node, each of the first wireless node and the second wireless node being configured to serve one or more child nodes, wherein the at least one configuration comprises information enabling the first wireless node or the second wireless node to manage interference to communications; and a transmitter configured to transmit the at least one configuration to at least one of the first wireless node or the second wireless node.

Certain aspects provide an apparatus for wireless communication. The apparatus generally includes: a receiver configured to receive, at a first wireless node, at least one configuration for communicating of one or more synchronization signal blocks (SSBs) between the first wireless node and a second wireless node, each of the first wireless node and the second wireless node being configured to serve one or more child nodes; and a processing system configured to interference to communications via the one or more SSBs based on at least one priority level associated with the first wireless node, the second wireless node, or both, the communications being by the first wireless node or the second wireless node.

Certain aspects provide an apparatus for wireless communication. The apparatus generally includes means for determining, based on a priority level associated with each of a first wireless node, a second wireless node, or both, at least one configuration for communicating one or more synchronization signal blocks (SSBs) between the first wireless node and the second wireless node, each of the first wireless node and the second wireless node being configured to serve one or more child nodes, wherein the at least one configuration comprises information enabling the first wireless node or the second wireless node to manage interference to communications, and means for transmitting the at least one configuration to at least one of the first wireless node or the second wireless node.

Certain aspects provide an apparatus for wireless communication. The apparatus generally includes means for receiving, at a first wireless node, at least one configuration for communicating of one or more synchronization signal blocks (SSBs) between the first wireless node and a second wireless node, each of the first wireless node and the second wireless node being configured to serve one or more child nodes, and means for managing interference to communications via the one or more SSBs based on at least one priority level associated with the first wireless node, the second wireless node, or both, the communications being by the first wireless node or the second wireless node.

Certain aspects provide a computer-readable medium having instructions stored thereon to cause one or more processors to determine, based on a priority level associated with each of a first wireless node, a second wireless node, or both, at least one configuration for communicating one or more synchronization signal blocks (SSBs) between the first wireless node and the second wireless node, each of the first wireless node and the second wireless node being configured to serve one or more child nodes, wherein the at least one configuration comprises information enabling the first wireless node or the second wireless node to manage interference to communications, and transmit the at least one configuration to at least one of the first wireless node or the second wireless node.

Certain aspects provide a computer-readable medium having instructions stored thereon to cause one or more processors to receive, at a first wireless node, at least one configuration for communicating of one or more synchronization signal blocks (SSBs) between the first wireless node and a second wireless node, each of the first wireless node and the second wireless node being configured to serve one or more child nodes, and manage interference to communications via the one or more SSBs based on at least one priority level associated with the first wireless node, the second wireless node, or both, the communications being by the first wireless node or the second wireless node.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Aspects of the present disclosure provide techniques for power management for an Integrated Access and Backhaul (IAB) network. Power management techniques may be implemented using configurations for measurement and transmission of synchronization signal blocks (SSBs). For instance, a central unit (CU) of the IAB network may configure high priority IAB-nodes to transmit SSBs more often, and low priority IAB-nodes to measure SSBs more often, in order to increase the likelihood that the low priority IAB-nodes will discover the high priority IAB-nodes. Once the high priority IAB-nodes are discovered, interference management actions may be taken in order to mitigate interference to the high priority nodes.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, a 5G NR RAT network may be deployed.

Figure 1:
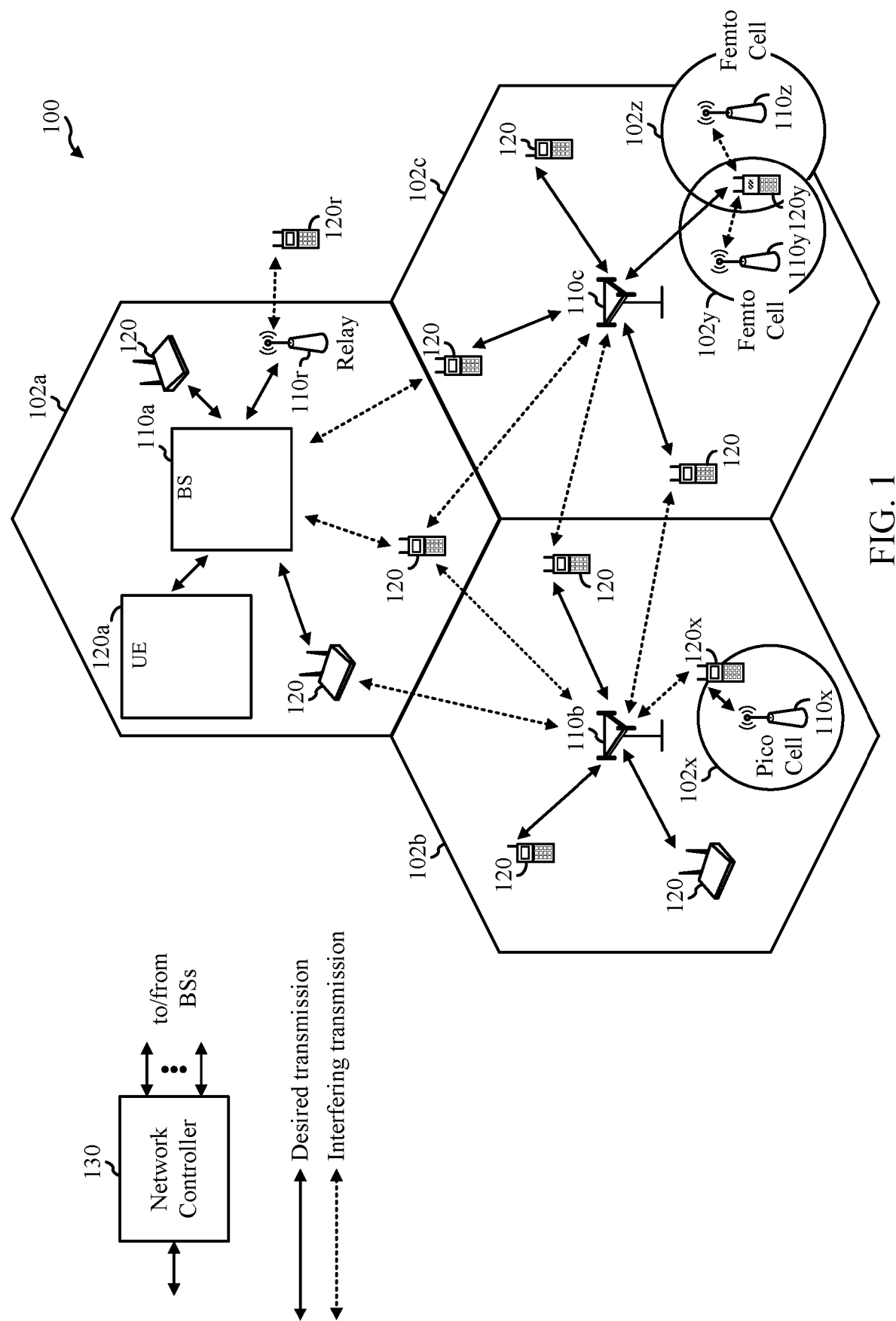
FIG. 1 is a block diagram conceptually illustrating an example telecommunications system, in accordance with certain aspects of the present disclosure.

FIG. 1 illustrates an example wireless communication network 100 in which aspects of the present disclosure may be performed. For example, the network 100 may include an IAB-node (implemented as a UE 120 or BS 110) configured to perform operations 700 of FIG. 7, a network entity (e.g., a BS 110) configured to perform operations 800 of FIG. 8.

As illustrated in FIG. 1, the wireless communication network 100 may include a number of base stations (BSs) 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. The BSs 110 communicate with user equipment (UEs) 120a-y (each also individually referred to herein as UE 120 or collectively as UEs 120) in the wireless communication network 100. The UEs 120 (e.g., 20x, 120y, etc.) may be dispersed throughout the wireless communication network 100, and each UE 120 may be stationary or mobile.

Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may couple to a set of BSs 110 and provide coordination and control for these BSs 110. The network controller 130 may communicate with the BSs 110 via a backhaul. The BSs 110 may also communicate with one another (e.g., directly or indirectly) via wireless or wireline backhaul.

Figure 2:
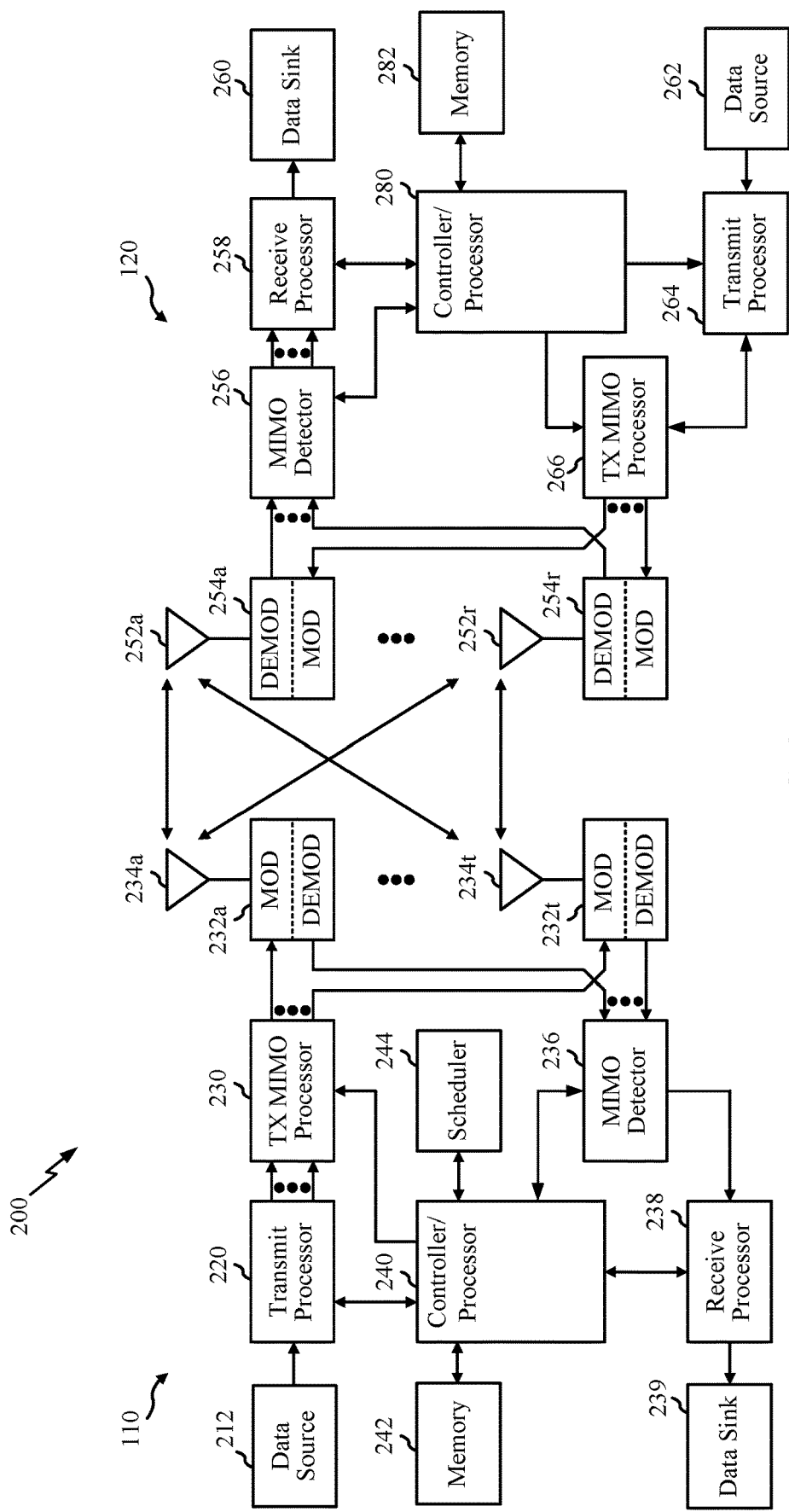
FIG. 2 is a block diagram conceptually illustrating a design of an example a base station (BS) and user equipment (UE), in accordance with certain aspects of the present disclosure.

FIG. 2 illustrates example components 200 of BS 110 and UE 120 (e.g., in the wireless communication network 100 of FIG. 1), which may be used to implement aspects of the present disclosure. For example, antennas 252, processors 266, 258, 264, and/or controller/processor 280 of the UE 120 and/or antennas 234, processors 220, 230, 238, and/or controller/processor 240 of the BS 110 may be used to perform the various techniques and methods described herein.

It should be noted that though FIG. 2 illustrates UE 120 communicating with a BS 110, an IAB-node may similarly communicate with a parent IAB-node (or other network entity) and each may (e.g., respectively) have similar components as discussed with respect to FIG. 2. In other words, an IAB-node may have similar components as UE 120 and may be configured to perform operations 800 of FIG. 8, while a CU may have similar components as BS 110 and may be configured to perform operations 700 of FIG. 7.

At the BS 110, a transmit processor 220 may receive data from a data source 212 and control information from a controller/processor 240. The control information may be for the physical broadcast channel (PBCH), physical control format indicator channel (PCFICH), physical hybrid automatic repeat request (HARD) indicator channel (PHICH), physical downlink control channel (PDCCH), group common PDCCH (GC PDCCH), etc. The data may be for the physical downlink shared channel (PDSCH), etc. The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and cell-specific reference signal (CRS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a-232t. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232a-232t may be transmitted via the antennas 234a-234t, respectively.

At the UE 120, the antennas 252a-252r may receive downlink signals from the BS 110 or a parent IAB-node, or a child IAB-node may receive downlink signals from a parent IAB-node, and may provide received signals to the demodulators (DEMODs) 254a-254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254a-254r, perform MIMO detection on the received symbols if applicable, and provide detected symbols. A receive processor 258 may process (e.g., demodulate, deinterleave, and decode) the detected symbols, provide decoded data for the UE 120 to a data sink 260, and provide decoded control information to a controller/processor 280. One or more of antennas 252, demodulators 254, MIMO detector 256, receive processor 258, transmit processor 264, TX MIMO processor 266, and/or the like may be components within a transceiver of the UE 120.

On the uplink, at UE 120 or a child IAB-node, a transmit processor 264 may receive and process data (e.g., for the physical uplink shared channel (PUSCH) or the PSSCH) from a data source 262 and control information (e.g., for the physical uplink control channel (PUCCH) or the PSCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the demodulators in transceivers 254a-254r (e.g., for SC-FDM, etc.), and transmitted to the base station 110 or a parent IAB-node.

At the BS 110 or a parent IAB-node, the uplink signals from the UE 120 may be received by the antennas 234, processed by the modulators 232, detected by a MIMO detector 236 if applicable, and further processed by a receive processor 238 to obtain decoded data and control information sent by the UE 120. The receive processor 238 may provide the decoded data to a data sink 239 and the decoded control information to the controller/processor 240. One or more of antennas 234, demodulators 232, TX MIMO processor 230, transmit processor 220, MIMO detector 236, receive processor 238, and/or the like may be components within a transceiver of the BS 110.

The controllers/processors 240 and 280 may direct the operation at the BS 110 and the UE 120, respectively. The controller/processor 240 and/or other processors and modules at the BS 110 may perform or direct the execution of processes for the techniques described herein. The controller/processor 280 and/or other processors and modules at the UE 120 may perform or direct the execution of processes for the techniques described herein. The memories 242, 282 may store data and program codes for BS 110 and UE 120, respectively. A scheduler 244 may schedule UEs for data transmission on the downlink and/or uplink.

Figure 3:
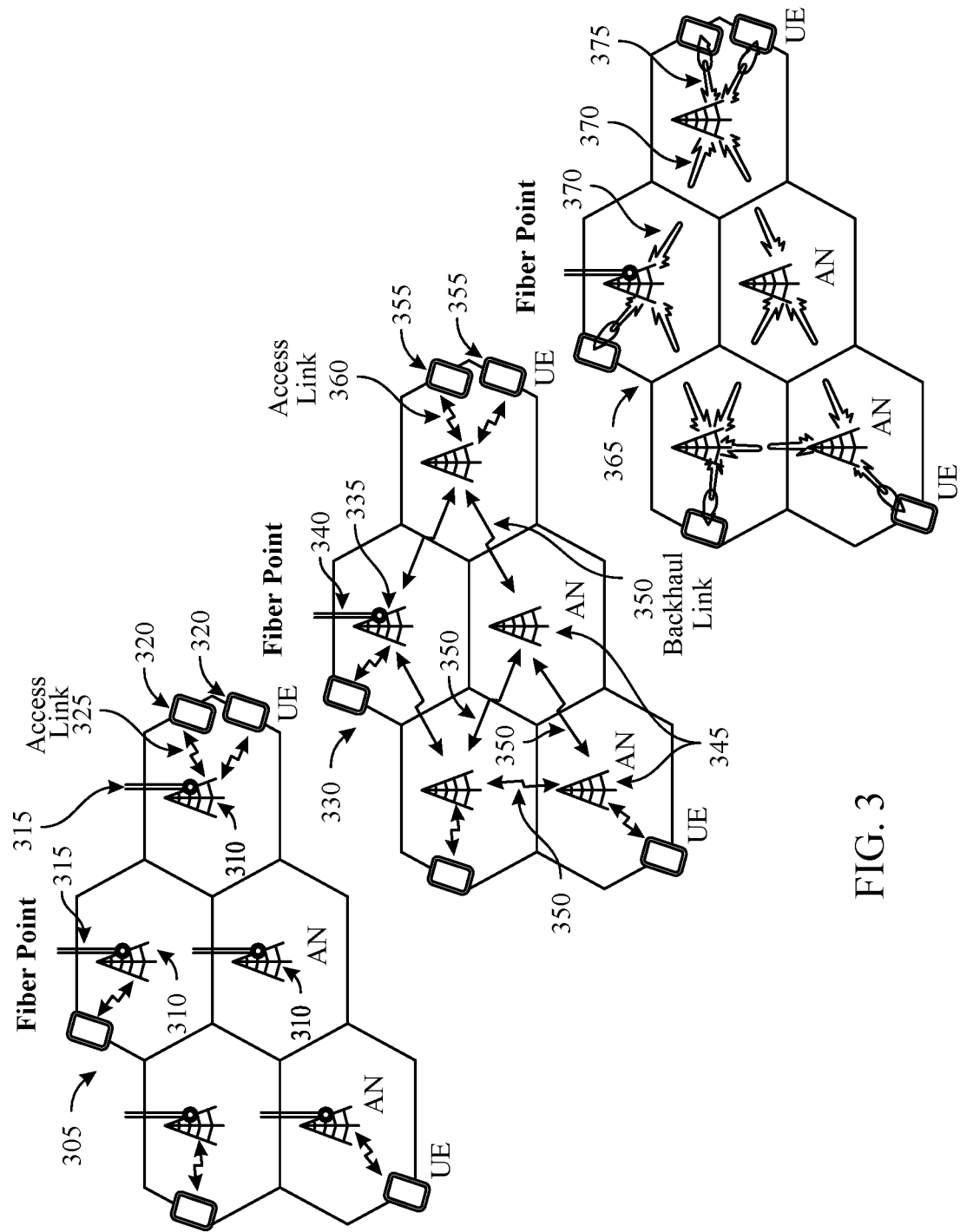
FIG. 3 is a diagram illustrating examples of radio access networks, in accordance with various aspects of the present disclosure.

FIG. 3 is a diagram illustrating examples of radio access networks, in accordance with various aspects of the disclosure.

As shown by reference number 305, a traditional (for example, 3G, 4G, LTE) radio access network may include multiple base stations 310 (for example, access nodes (AN)), where each base station 310 communicates with a core network via a wired backhaul link 315, such as a fiber connection. A base station 310 may communicate with a UE 320 via an access link 325, which may be a wireless link. In some aspects, a base station 310 shown in FIG. 3 may correspond to a base station 110 shown in FIG. 1. Similarly, a UE 320 shown in FIG. 3 may correspond to a UE 120 shown in FIG. 1.

As shown by reference number 330, a radio access network may include a wireless backhaul network. In some aspects or scenarios, a wireless backhaul network may sometimes be referred to as an integrated access and backhaul (IAB) network. An IAB network may include multiple base stations and sometimes the base stations may be of differing types or have differing operational characteristics. For example, in some aspects, an IAB network may have at least one base station that is an anchor base station 335. The anchor base station may communicates with a core network via a wired backhaul link 340, such as a fiber connection. An anchor base station 335 may also be referred to as an IAB donor. An IAB donor is an access node with wireline connection to a core network. An IAB node is an access node that relays traffic from/to Anchor through one or multiple hops. Anchor base stations can be configured to communicate with other types of base stations or other communication devices (e.g. in a radio network or IAB network).

The IAB network may also include one or more non-anchor base stations 345. Non-anchor base stations may be referred to as relay base stations or IAB nodes. The non-anchor base station 345 may communicate directly with or indirectly with (for example, via one or more other non-anchor base stations 345) the anchor base station 335 via one or more backhaul links 350 to form a backhaul path to the core network for carrying backhaul traffic. Backhaul link 350 may be a wireless link. Anchor base station(s) 335 or non-anchor base station(s) 345 may communicate with one or more UEs 355 via access links 360, which may be wireless links for carrying access traffic. In some aspects, an anchor base station 335 or a non-anchor base station 345 shown in FIG. 3 may correspond to a base station 110 shown in FIG. 1. Similarly, a UE 355 shown in FIG. 3 may correspond to a UE 120 shown in FIG. 1.

As shown by reference number 365, in some aspects, a radio access network that includes an IAB network may utilize a variety of spectrum types. For example, an IAB network may utilize a variety of differing radio frequency bands. In a few particular examples and according to some aspects, millimeter wave technology or directional communications can be utilized (for example, beamforming, precoding) for communications between base stations or UEs (for example, between two base stations, between two UEs, or between a base station and a UE). In additional or alternative aspects or examples, wireless backhaul links 370 between base stations may use millimeter waves to carry information or may be directed toward a target base station using beamforming, precoding. Similarly, the wireless access links 375 between a UE and a base station may use millimeter waves or may be directed toward a target wireless node (for example, a UE or a base station). In this way, inter-link interference may be reduced.

In some aspects, an IAB network may support a multi-hop network or a multi-hop wireless backhaul. Additionally, or alternatively, each node of an IAB network may use the same radio access technology (for example, 5G/NR). Additionally, or alternatively, nodes of an IAB network may share resources for access links and backhaul links, such as time resources, frequency resources, spatial resources. Furthermore, various architectures of IAB nodes or IAB donors may be supported.

In some aspects, an IAB donor may include a central unit (CU) that configures IAB nodes that access a core network via the IAB donor and may include a distributed unit (DU) that schedules and communicates with child nodes of the IAB donor.

In some aspects, an IAB node may include a mobile termination component (MT) that is scheduled by and communicates with a DU of a parent node, and may include a DU that schedules and communicates with child nodes of the IAB node. A DU of an IAB node may perform functions described in connection with base station 110 for that IAB node, and an MT of an IAB node may perform functions described in connection with UE 120 for that IAB node.

Figure 4:
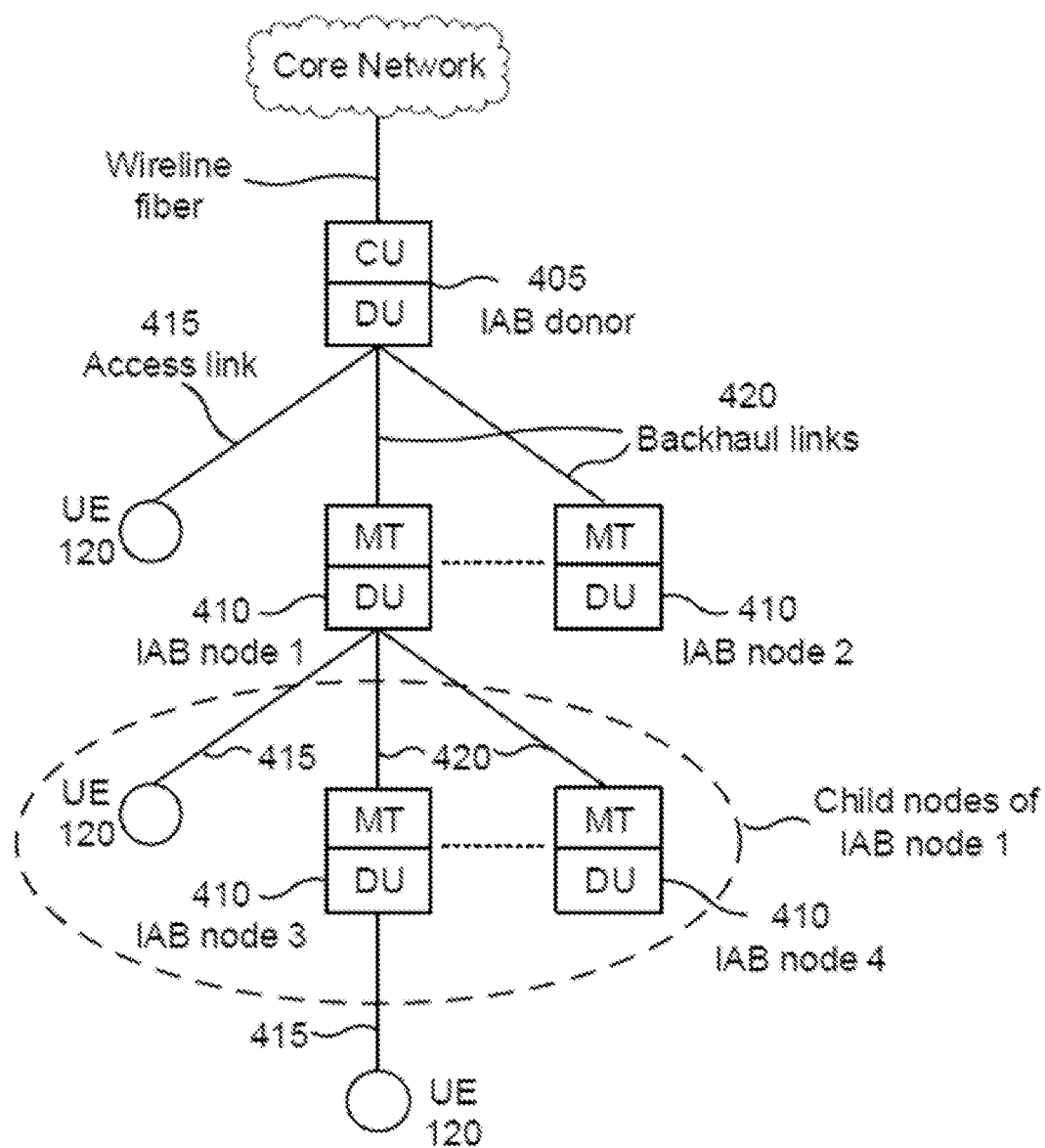
FIG. 4 is a diagram illustrating an example of an integrated access and backhaul (IAB) network architecture in accordance with various aspects of the disclosure.

FIG. 4 is a diagram illustrating an example of an IAB network architecture, in accordance with various aspects of the disclosure. As shown in FIG. 4, an IAB network may include an IAB donor 405 that connects to a core network via a wired connection (for example, as a wireline fiber). For example, an Ng interface of an IAB donor 405 may terminate at a core network. Additionally, or alternatively, an IAB donor 405 may connect to one or more devices of the core network that provide a core access and mobility management function (AMF). In some aspects, an IAB donor 405 may include a base station 110, such as an anchor base station, as described above in connection with FIG. 3. As shown, an IAB donor 405 may include a CU, which may perform ANC functions or AMF functions. The CU may configure a DU of the IAB donor 405 or may configure one or more IAB nodes 410 (for example, an MT or a DU of an IAB node 410) that connect to the core network via the IAB donor 405. Thus, a CU of an IAB donor 405 may control or configure the entire IAB network that connects to the core network via the IAB donor 405, such as by using control messages or configuration messages (for example, a radio resource control (RRC) configuration message, an F1 application protocol (F1AP) message).

As described above, the IAB network may include IAB nodes 410 (shown as IAB nodes 1 through 4) that connect to the core network via the IAB donor 405. As shown, an IAB node 410 may include an MT and may include a DU. The MT of an IAB node 410 (for example, a child node) may be controlled or scheduled by another IAB node 410 (for example, a parent node) or by an IAB donor 405. The DU of an IAB node 410 (for example, a parent node) may control or schedule other IAB nodes 410 (for example, child nodes of the parent node) or UEs 120. Thus, a DU may be referred to as a scheduling node or a scheduling component, and an MT may be referred to as a scheduled node or a scheduled component. In some aspects, an IAB donor 405 may include a DU and not an MT. That is, an IAB donor 405 may configure, control, or schedule communications of IAB nodes 410 or UEs 120. A UE 120 may include only an MT, and not a DU. That is, communications of a UE 120 may be controlled or scheduled by an IAB donor 405 or an IAB node 410 (for example, a parent node of the UE 120).

According to some aspects, certain nodes may be configured to participate in control/scheduling processes. For example in some aspects, when a first node controls or schedules communications for a second node (for example, when the first node provides DU functions for the second node's MT), the first node may be referred to as a parent node of the second node, and the second node may be referred to as a child node of the first node. A child node of the second node may be referred to as a grandchild node of the first node. Thus, a DU of a parent node may control or schedule communications for child nodes of the parent node. A parent node may be an IAB donor 405 or an IAB node 410, and a child node may be an IAB node 410 or a UE 120. Communications of an MT of a child node may be controlled or scheduled by a parent node of the child node.

As further shown in FIG. 4, a link between a UE 120 and an IAB donor 405, or between a UE 120 and an IAB node 410, may be referred to as an access link 415. Each access link 415 may be a wireless access link that provides a UE 120 with radio access to a core network via the IAB donor 405, and potentially via one or more IAB nodes 410.

As further shown in FIG. 4, a link between an IAB donor 405 and an IAB node 410, or between two IAB nodes 410, may be referred to as a backhaul link 420. Each backhaul link 420 may be a wireless backhaul link that provides an IAB node 410 with radio access to a core network via the IAB donor 405, and potentially via one or more other intermediate IAB nodes 410. In some aspects, a backhaul link 420 may be a primary backhaul link or a secondary backhaul link (for example, a backup backhaul link). In some aspects, a secondary backhaul link may be used if a primary backhaul link fails, becomes congested, or becomes overloaded. In an IAB network, network resources for wireless communications (for example, time resources, frequency resources, spatial resources) may be shared between access links 415 and backhaul links 420.

As described above, in a typical IAB network, IAB nodes (for example, non-anchor base stations) are stationary (that is, non-moving). Next generation (5G) wireless networks have stated objectives to provide ultra-high data rate and support wide scope of application scenarios. Integrated access and backhaul (IAB) systems have been studied in 3GPP as one possible solution to help support these objectives.

As noted above, in IAB, a wireless backhaul solution is adopted to connect cells (IAB-nodes) to the core network (which uses a wired backhaul). Some attractive characteristics of IAB are support for multi-hop wireless backhaul, sharing of the same technology (e.g., NR) and resources (e.g., frequency bands) for both access and backhaul links.

There are various possible architectures for IAB-nodes, including layer-2 (L2) and layer-3 (L3) solutions and a particular architecture deployed may depend on what layers of protocol stack are implemented in the intermediate nodes (IAB-nodes), for example, L2 relays may implement PHY/MAC/RLC layers.

As described herein, an IAB donor may be an enhanced gNB node with functions to control IAB-network. A CU may refer to the central entity that controls the entire IAB-network through configuration. The CU holds RRC/PDCP layer functions. A DU may be a scheduling node that schedules child nodes of this IAB-donor. The DU holds RLC/MAC/PHY layer functions. An IAB-node is a L2 relay node consisting of MT and DU functions, as described herein. MT is a scheduled node similar to UE scheduled by its parent IAB-node or IAB-donor. A DU is a scheduling node that schedules child nodes of this IAB-node.

Example Power Management Priority Handling in Integrated Access and Backhaul

Certain aspects of the present disclosure are directed to power management (PM) techniques for handling interference for integrated access and backhaul (IAB) networks. For example, a central unit (CU) of the IAB network may configure transmission and measurement of SSBs in order to increase the likelihood that a lower priority node discovers a higher priority node, allowing the lower priority node to take actions to reduce interference with the higher priority node. In some cases, the configuration by the CU allows nodes to infer a priority level of themselves, or other nodes. The priority levels allow the nodes to determine what actions to perform for interference management, as described in more detail herein.

Figure 5A:
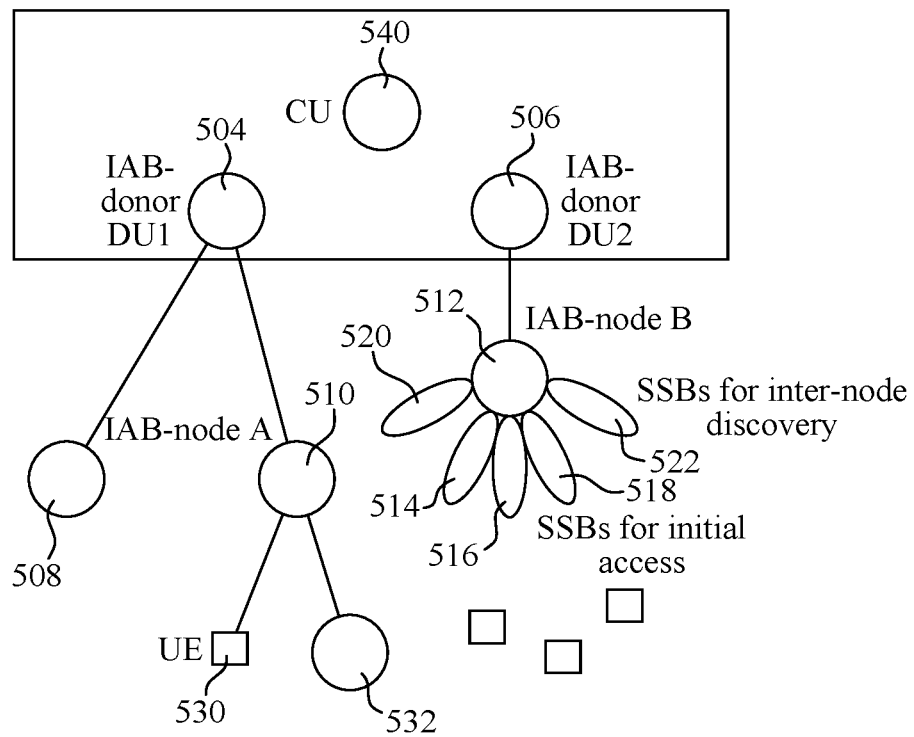
FIGS. 5A and 5B illustrates inter-node discovery for an IAB network, in accordance with certain aspects of the present disclosure.
Figure 5B:
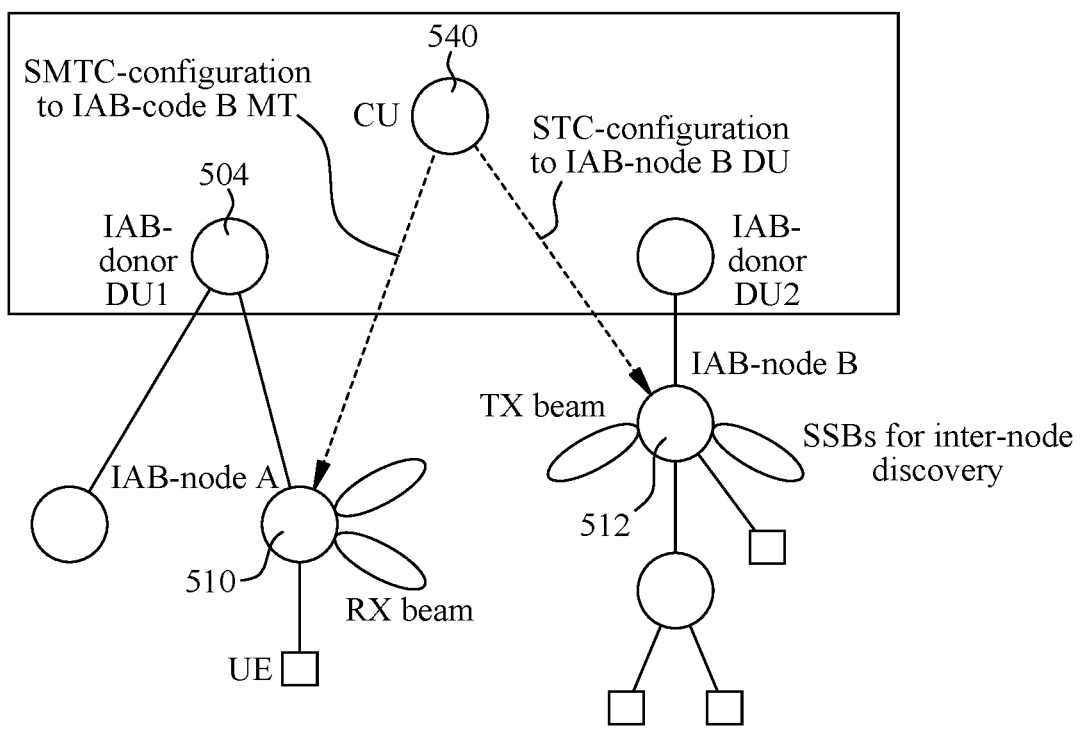

FIGS. 5A and 5B illustrates inter-node discovery for an IAB network, in accordance with certain aspects of the present disclosure. The IAB network may be managed by a CU 540. As illustrated, the IAB-donor DU 504 may serve IAB-nodes 508, 510 and the IAB-donor DU 506 may serve IAB-node 512. As illustrated, the IAB-node 512 may transmit SSBs 514, 516, 518 for initial access (e.g., for one or more UEs). The DU of the IAB-node 512 may also transmit SSBs 520, 522 for inter-node discovery. For example, the MT of the IAB-node 510 may discover the IAB-node 512 by detecting the SSB 520. IAB-node discovery may be performed for potential future handover (HO) or to establish a redundant link. Sending SSBs for inter-node discovery by IAB-node 512 should not impact UEs that may attempt initial access to a base station via the DU of the IAB-node 512.

IAB-node 510 has its own communication with a parent node (e.g., IAB-donor DU 504) and child nodes (e.g., UE 530 or IAB-node 532). IAB-node 510 may be actively transmitting, and due to half-duplex constraints (e.g., inability to receive and transmit at the same time) that may apply for IAB-node 510, the IAB-node 510 may be unable to discover the SSB transmitted from IAB-node 512.

As illustrated in FIG. 5B, the CU 540 may indicate an SSB transmission configuration (STC) to the IAB-node 512 and an SSB measurement time configuration (SMTC) (also referred to herein as SSB measurement configuration (SMC)) to the IAB-node 510 to facilitate transmission and measurement of SSBs for inter-node discovery. For example, the IAB-node 510 may be an aggressor (e.g., causing interference to IAB-node 512), and the IAB-node 512 may have a higher priority level than the IAB-node 510 (e.g. aggressor). The SSBs transmitted by IAB-node 512 for inter-node discovery may indicate the priority level of IAB-node 512. Thus, the IAB-node 510 may determine the priority level of IAB-node 512 when discovering the IAB-node 512. In certain aspects, the CU 540 may configure more frequent STC windows at IAB-node 512 and more frequent SMTC windows at IAB-node 510 in order for IAB-node 510 to detect the priority level of IAB-node 512 with higher probability, allowing the IAB-node 510 to take proper measures for interference management.

Figure 6A:
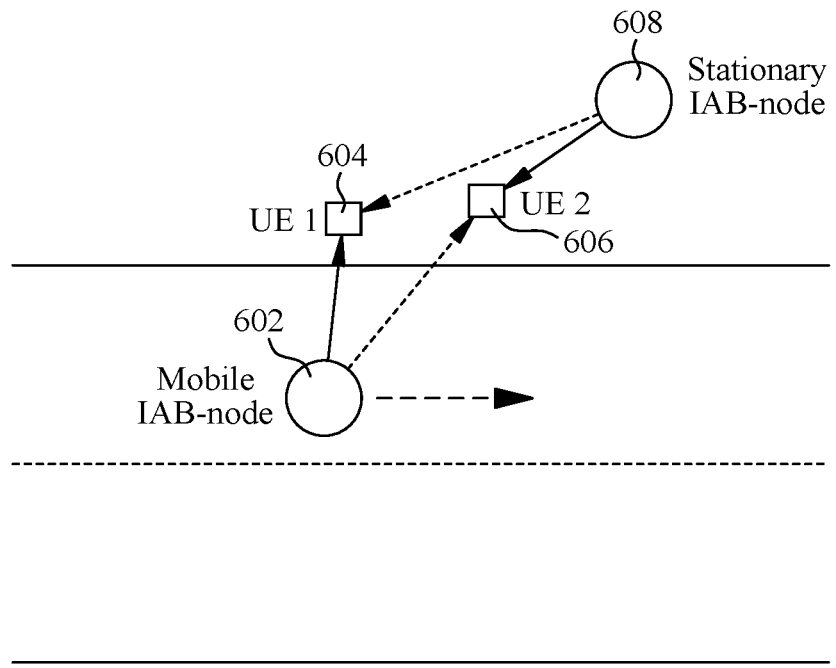
FIGS. 6A, 6B, 6C illustrate various communication systems showing difference interference scenarios.
Figure 6B:
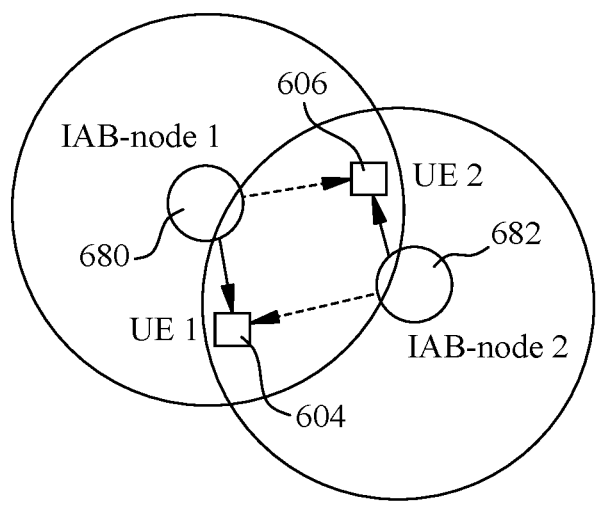
Figure 6C:
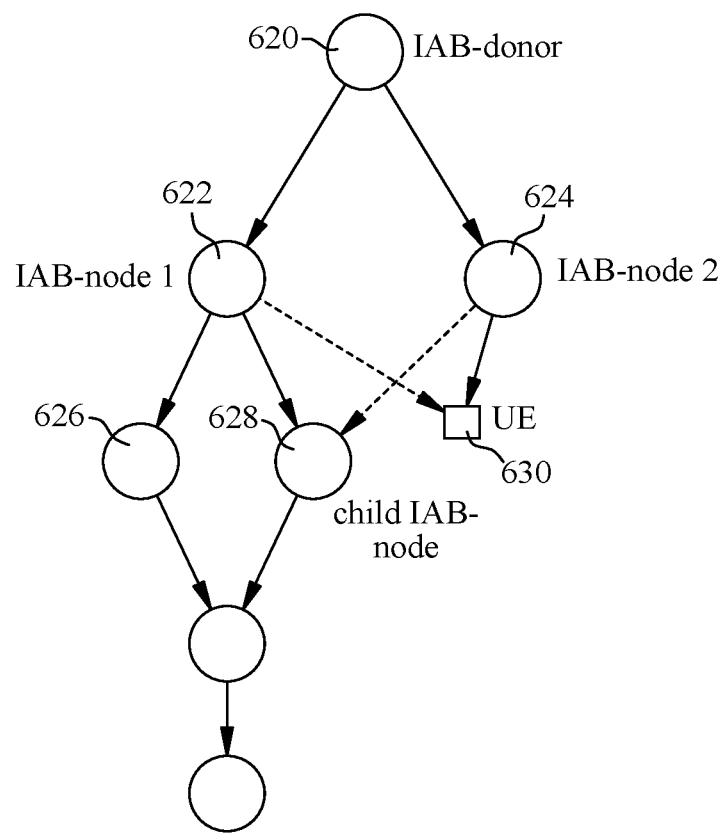

FIGS. 6A, 6B, 6C illustrate various communication systems showing difference interference scenarios in IAB networks. In certain aspects, IAB nodes (e.g., the MT of the IAB node) may perform signal measurements and may not have to rely on measurements done by a UE. An IAB node has L2 functionality, therefore, any L3 measurements performed by a UE may be reported to a CU due to the split of CU and DU as described herein.

As illustrated in FIG. 6A, a mobile IAB-node 602 (e.g., an IAB-node on a vehicle) may be serving a UE 604. The mobile IAB-node 602 may transmit to a UE 604, yet cause interference to a UE 606 that is served by a stationary IAB-node 608. Similarly, the transmission by the IAB-node 608 to the UE 606 may cause interference to the UE 604 being served by the mobile IAB-node 602. In this case, the mobile IAB-node 602, causing interference to the stationary IAB-node 608, may reduce the downlink (DL) transmit power to the UE 604 to reduce the interference.

In an over deployed network, or zero-network planning scenario, as illustrated in FIG. 6B, multiple IAB nodes may have overlapping coverage, causing interference to each other. As illustrated in FIG. 6B, UE 604 and UE 606 are both in an overlapping coverage area with overlapping coverage from both IAB-node 680 and IAB-node 682. Therefore, tiebreaking rules may be used to determine which IAB node may reduce its DL transmit power, as described in more detail herein.

A multi-hop IAB implementation is illustrated in FIG. 6C. As illustrated, the IAB-donor 620 may serve IAB-nodes 622, 624, the IAB-node 624 may serve the UE 630, and the IAB-node 622 may serve the child IAB-nodes 626, 628. The transmission to the UE 630 from the IAB-node 624 may be causing interference to the child IAB node 628. Moreover, the transmission to the child IAB-node 628 by the IAB-node 622 may cause interference to the UE 630. In certain implementations, an IAB-node may determine to reduce its transmit power in order to reduce the interference to another node. For example, in such a scenario, the IAB-node 624 may yield to IAB-node 622 and reduces the DL transmit power to the UE 630. The backhaul (BH) link to the child IAB-nodes 626, 628 may be favored over the access link between the IAB-node 624 and the UE 630. Moreover, the IAB-node 622 has a higher load, and thus, may be prioritized for power management.

In certain implementations, an IAB-node may modify the TX configuration of its DU or its child MT/UE if it determines that the current configuration adds excessive interference to a victim node of higher PM priority level. An IAB-node may send an indication of excessive interference to an aggressor IAB-node or the CU if it determines the aggressor node is of lower priority level. In some cases, interfering IAB-nodes may follow tiebreaking rules if the IAB-nodes have equal priority levels.

In certain aspects of the present disclosure, a CU may configure SMTC and/or STC properly so that inter-node discovery procedure can be used to enable interference measurement and/or mitigation. In context of STC configuration, an IAB-node may refer to an IAB-node (e.g., IAB-node 510 or 512) as well as an IAB-donor DU (e.g., IAB-donor DU 504). As used herein, an SMTC configuration may include various parameters such as SSB center frequency (e.g., a center frequency associated with the transmission of the one or more SSBs), SSB subcarrier spacing (e.g., an SSB subcarrier spacing associated with the transmission of the one or more SSBs), SMTC window periodicity (e.g., the measurement occurring every period T corresponding to the SMTC window periodicity), SMTC window timing offset (e.g., timing offset from a reference point in time), SMTC window duration (e.g., duration of the window during which the measurement is performed), list of one or more physical cell IDs to be measured, list of the one or more SSBs to be measured, or any combination thereof.

In some cases, multiple SMTCs may be configured for each IAB-node, as described in more detail herein. The STC configuration may include various parameters such as SSB center frequency, SSB subcarrier spacing, SSB transmission periodicity (e.g., periodicity of the transmission of the one or more SSBs), SSB transmission timing offset, index of SSBs to transmit (e.g., at least one index associated with the one or more SSBs to be transmitted), or any combination thereof. In certain aspects, multiple STCs may be configured for an IAB-node, as described in more detail herein. The STC configuration may be specific to a cell or frequency location per DU.

Figure 7:
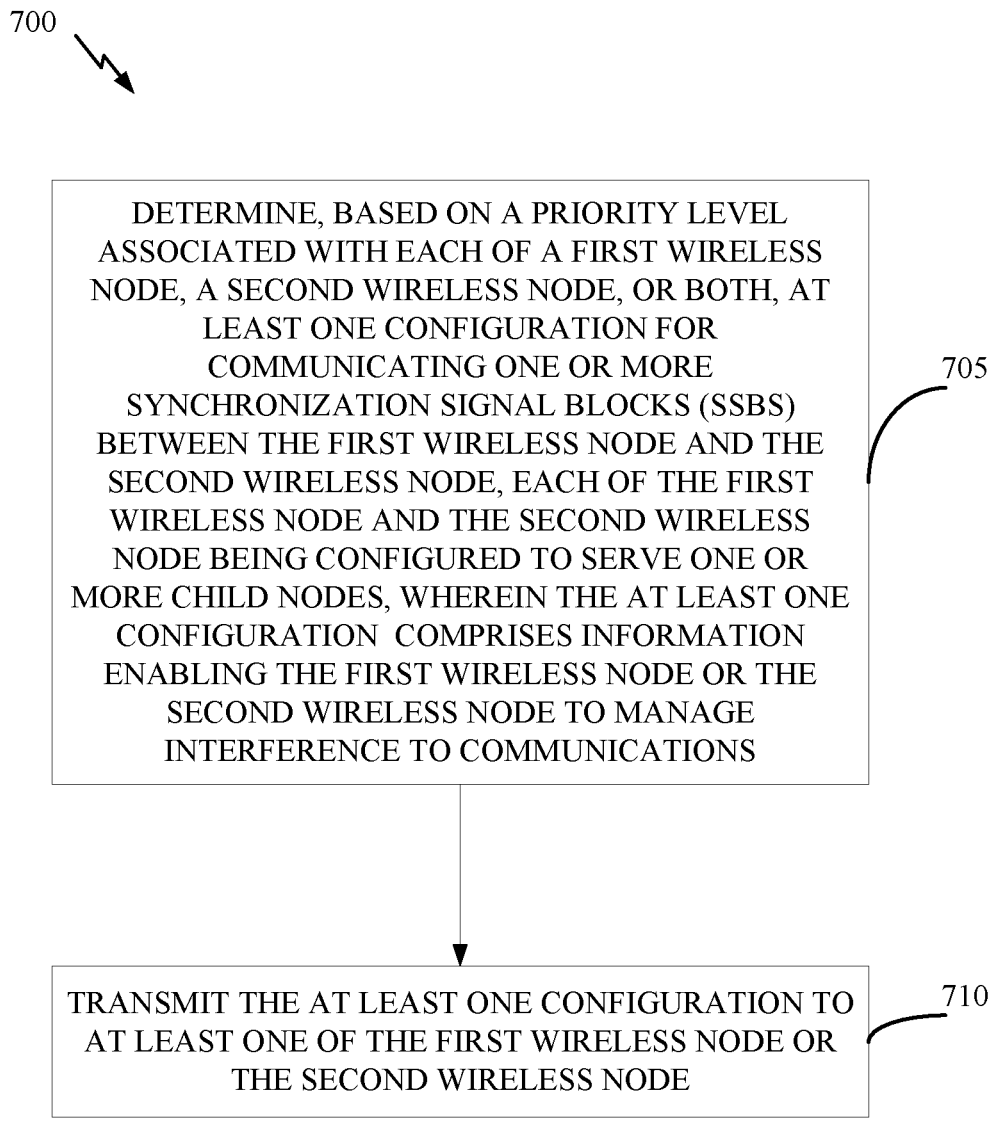
FIG. 7 illustrates a flow diagram illustrating example operations for wireless communication, in accordance with various aspects of the disclosure.

FIG. 7 is a flow diagram illustrating example operations 700 for wireless communication, in accordance with certain aspects of the present disclosure. The operations 700 may be performed by a central unit, such as the CU 540.

Operations 700 may be implemented as software components that are executed and run on one or more processors (e.g., controller/processor 240 of FIG. 2). Further, the transmission and reception of signals by the first wireless communication device in operations 700 may be enabled, for example, by one or more antennas (e.g., antennas 234 of FIG. 2). In certain aspects, the transmission and/or reception of signals by the first wireless communication device may be implemented via a bus interface of one or more processors (e.g., controller/processor 230, 220, 238, 240, and 244) obtaining and/or outputting signals.

Operations 700 may begin, at block 705, with the CU determining, based on a priority level associated with each of a first wireless node (e.g., a first IAB-node), a second wireless node (e.g. a second IAB-node), or both, at least one configuration for communicating one or more SSBs between the first wireless node and the second wireless node, each of the first wireless node and the second wireless node being configured to serve one or more child nodes. In some aspects, the at least one configuration may include information enabling the first wireless node or the second wireless node to manage interference to communications. For example, the information in the at least one configuration that enables the interference management may include information regarding periodicity of transmission or measurement of one or more SSBs, a duration or quantity of at least one window for measurement or transmission of the one or more SSBs, a quantity of the one or more SSBs to be transmitted or measured, or any combination thereof. In some aspects, the information that enables the interference management may comprise SSB measurement time configuration (SMTC) or a SSB transmission configuration (STC), as described in more detail herein. At block 710, the CU may transmit the at least one configuration to at least one of the first wireless node or the second wireless node.

In certain aspects, a CU may select an SMTC configuration and/or an STC configuration of an IAB-node (e.g., the first wireless node described with respect to FIG. 7) based on a priority level of the IAB-node. The CU may set the SMTC and/or STC in order to increase the likelihood that a high priority IAB-node (e.g., second wireless node) is discovered, allowing other wireless nodes (e.g., the first wireless node) to take actions to mitigate interference with the high priority IAB-node.

In certain aspects, the at least one configuration (e.g., the information enabling interference management) determined at block 705 of FIG. 7 may indicate a cell identifier (ID) to be measured by the first wireless node based on the one or more SSBs, the cell ID being associated with the second wireless node if the priority level of the second wireless is greater than the priority level of the first wireless node. In other words, the CU may indicate a list of physical cell IDs to be measured that are associated with a higher priority level IAB-node (e.g. the second wireless node described with respect to FIG. 7).

In certain aspects, the at least one configuration (e.g., STC and/or SMTC) determined at block 705 of FIG. 7 may indicate, to the first wireless node, to measure the one or more SSBs transmitted by the second wireless node if the priority level of the second wireless node is greater than the priority level of the first wireless node. For example, a CU may indicate SSBs to measure in an SMTC configuration corresponding to transmitted SSBs by an IAB-node (e.g., second wireless node) of higher priority level.

In certain aspects, the at least one configuration (e.g., STC) (e.g., the information enabling interference management) determined at block 705 of FIG. 7 may configure a periodicity of transmission of the one or more SSBs by the first wireless node based on a policy that the periodicity decreases as the priority level associated with the first wireless node increases. For example, the CU may reduce the SSB transmission periodicity in STC configuration of an IAB-node as the priority level of the IAB-node increases and vice-versa. In some cases, the at least one configuration (e.g., SMTC) may configure a periodicity of measurement of the one or more SSBs by the second wireless node based on a policy that the periodicity decreases as the priority level associated with the second wireless node decreases.

In other words, as the priority level of the first wireless node increases, the configured STC window periodicity for the first wireless node may be decreased (e.g., the first wireless node may transmit SSBs more often). On the other hand, as the priority level of the second wireless node is decreases, the configured SMTC window periodicity for the second wireless node may be decreased (e.g., the second wireless node may measure SSBs more often). That is, the CU may increase the SMTC window periodicity of an IAB-node as the priority level of the IAB-node increases and vice-versa.

In certain aspects, the at least one configuration (e.g., SMTC) (e.g., the information enabling interference management) determined at block 705 of FIG. 7 may align a window for measurement of the one or more SSBs by the first wireless node and a transmission of the one or more SSBs by the second wireless node if the priority level of the second wireless node is greater than the first wireless node. On the other hand, the at least one configuration (e.g., SMTC) may set a window for measurement of the one or more SSBs by the first wireless node and a transmission of the one or more SSBs by the second wireless node to be non-overlapping if the priority level of the second wireless node is less than the first wireless node.

In certain aspects, the at least one configuration (e.g., SMTC) (e.g., the information enabling interference management) determined at block 705 of FIG. 7 may set a configuration for measurement of the one or more SSBs by the first wireless node to be equal to a configuration for transmission of the one or more SSBs by the second wireless node if the priority level of the second wireless node is greater than the first wireless node. For instance, the CU may choose an SMTC window timing offset (a timing offset associated with the transmission of the one or more SSBs), SSB center frequency (e.g., a center frequency associated with the one or more SSBs), and SSB subcarrier spacing (e.g., a subcarrier spacing associated with the one or more SSBs), to align the SMTC window with the STC window of another node (e.g., second wireless node) of higher priority level, or choose an SMTC window to be non-overlapping with an STC window of another node of lower PM priority level. For STC, the CU may match the SSB center frequency and SSB subcarrier spacing in STC of a higher priority node to the SSBs to be measured based on SMTC for a node with lower priority level, increasing the likelihood of the lower priority node discovering the higher priority node. In certain aspects, the CU may select the SSB transmission timing offset to align the STC window of a higher priority node with SMTC window of another node of lower priority level, or choose an STC window of a lower priority node to be non-overlapping with the SMTC window of another node of higher priority level.

In certain aspects, the at least one configuration (e.g., the information enabling interference management) may configure a duration of a window for measurement of the one or more SSBs by the first wireless node based on a policy that the duration of the window decreases as the priority level associated with the first wireless node increases. That is, the CU may reduce SMTC window duration as the priority level increases and vice-versa.

In certain aspects, the at least one configuration (e.g., the information enabling interference management) determined at block 705 of FIG. 7 may set a quantity of the one or more SSBs to be transmitted by the second wireless node during a unit of time (e.g., a half-frame) based on a policy that the quantity increases as the priority level of the second wireless node increases. For example, the CU may indicate an index of SSBs to transmit in STC configuration. The CU may increase the number of SSBs to be transmitted by an IAB-node in a half-frame as the priority level of the IAB-node increases and vice-versa.

In some cases, the at least one configuration (e.g., SMTC) (e.g., the information enabling interference management) determined at block 705 of FIG. 7 may set a quantity of one or more windows for measurement of the one or more SSBs by the first wireless node based on a policy that the quantity decreases as the priority level of the first wireless node increases. Similarly, the at least one configuration (e.g., STC) may set a quantity of one or more windows for transmission of the one or more SSBs by the second wireless node based on a policy that the quantity increases as the priority level of the second wireless node increases. In other words, the CU may reduce the number of SMTC windows of an IAB-node as the priority level of the IAB-node increases and vice versa. The CU may increase the number of STC windows of an IAB-node as the priority level increases and vice-versa.

In certain implementations, an IAB-node may receive multiple STC or SMTC configurations. Each of the configurations may be independent as a function of a priority level of the IAB-node. In certain aspects, an IAB-node may have multiple priority levels (e.g. corresponding to transmissions on different resources). An IAB-node may receive one or more STC or SMTC configurations, each of which being function of one or more priority levels of the IAB-node. That is, the first wireless node may be associated with a plurality of priority levels, and the at least one configuration may include a configuration associated with each of the plurality of priority level.

In certain implementations, the CU may detect a potential for the interference to be caused by the communications of the first wireless node to the communications by the second wireless node. In this case, the at least one configuration determined at block 705 of FIG. 7 may include at least one of a configuration for the second wireless node to detect the first wireless node, a configuration for the first wireless node to detect the second wireless node, or a configuration for at least one of the first wireless node or the second wireless node to detect the interference, as described in more detail herein. The detection of the potential for the interference may be in response to the one or more parameters, the one or more parameters including one or more parameters of a measurement report, or an indication of the interference from the second wireless node (e.g., the victim of the interference).

In other words, if a CU determines that one node's communication may add interference to a neighboring node's communication, the CU may configure SMTC and/or STC of the two nodes so that the node detects potential victims, based on which the node may take one or more interference management actions such as modifying TX configuration of its DU, or modify TX configuration of a child MT/UE. The CU may also configure the SMTC and/or STC of the two nodes so that a node detects potential aggressors, based on which the node may send an indication of interference to the CU and/or aggressor node, or send a priority level to the CU and/or aggressor node. The SMTC and/or STC may also be configured so the node measures interference from another node. The configuration of SMTC and/or STC by the CU (or CU's determination that there is interference) may be triggered by a measurement report sent by a node, or an indication of interference sent by a victim node, as described herein.

Figure 8:
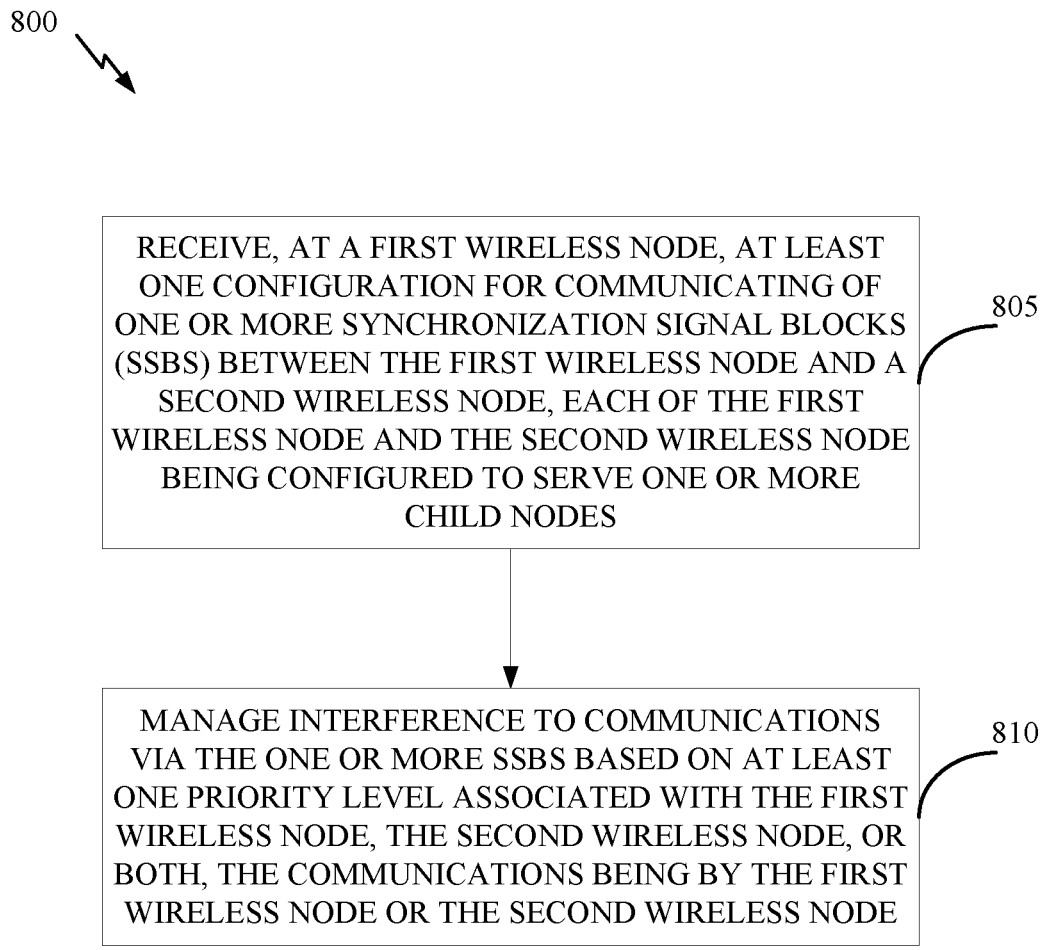
FIG. 8 illustrates a flow diagram illustrating example operations for wireless communication, in accordance with various aspects of the disclosure.

FIG. 8 is a flow diagram illustrating example operations 800 for wireless communication, in accordance with certain aspects of the present disclosure. The operations 800 may be performed by an IAB-node.

Operations 800 may be implemented as software components that are executed and run on one or more processors (e.g., controller/processor 280 of FIG. 2). Further, the transmission and reception of signals by the first wireless communication device in operations 800 may be enabled, for example, by one or more antennas (e.g., antennas 252 of FIG. 2). In certain aspects, the transmission and/or reception of signals by the first wireless communication device may be implemented via a bus interface of one or more processors (e.g., controller/processor 258, 264, 266, and/or 280) obtaining and/or outputting signals.

Operations 800 begin, at block 805, with the IAB-node receiving, at a first wireless node (e.g., IAB-node 510), at least one configuration for communication of one or more SSBs between the first wireless node and a second wireless node (IAB-node 512), each of the first wireless node and the second wireless node being configured to serve one or more child nodes. At block 810, the IAB-node may manage interference to communications based on the at least one configuration, the communications being by the first wireless node or the second wireless node. In certain aspects, the interference may be managed based on at least one priority level associated each of at least one of the first wireless node or the second wireless node.

In certain aspects, the IAB-node may infer the at least one priority level of the second wireless node. The at least one priority level may be inferred based on detection of the one or more SSBs transmitted by the second wireless node during an SSB occasion that is configured for SSB transmissions by nodes having the at least one priority level, as described in more detail with respect to FIG. 9.

Figure 9:
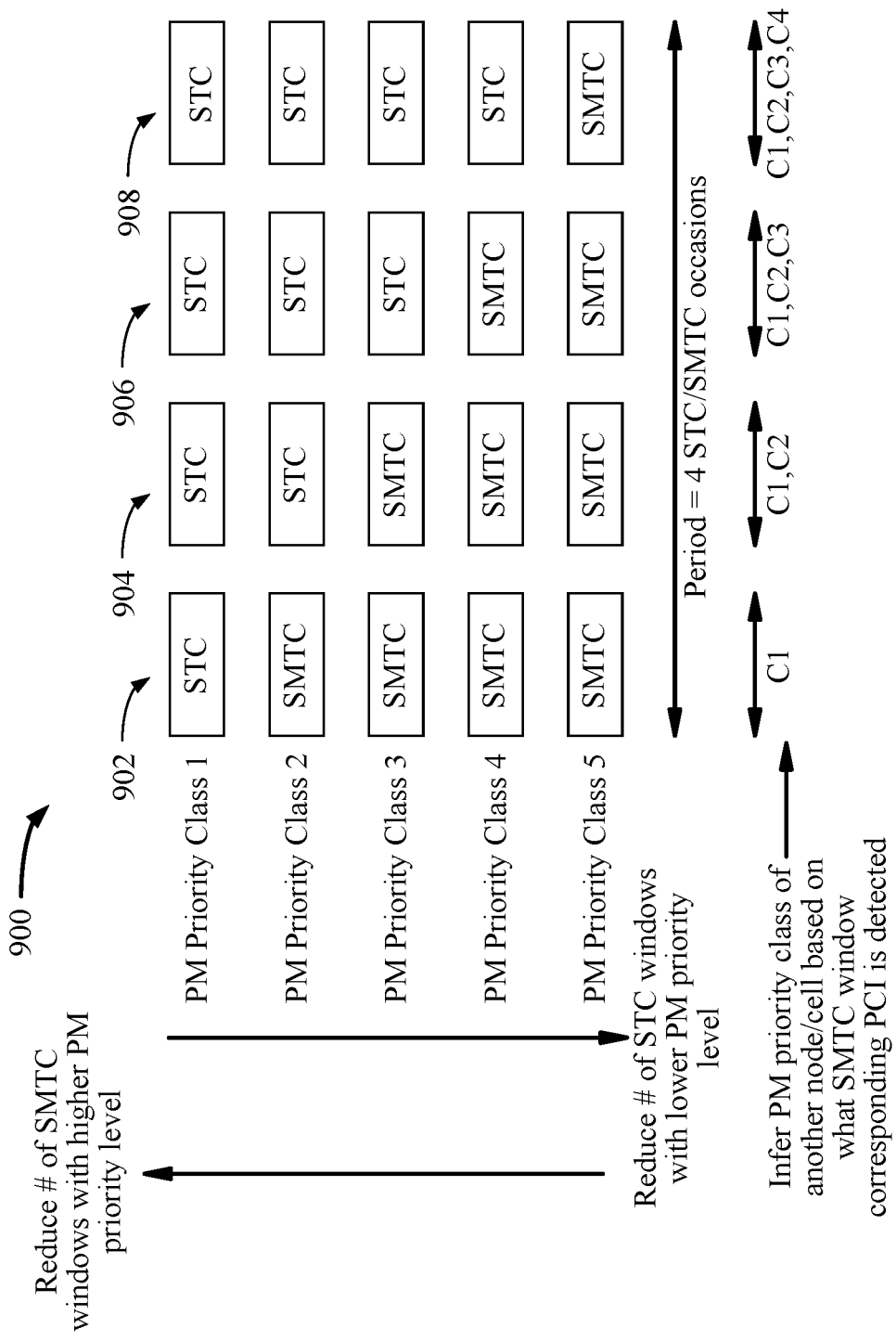
FIG. 9 illustrates various synchronization signal block (SSB) occasions configured for transmission and measurement of SSBs based on priority levels of IAB-nodes, in accordance with certain aspects of the present disclosure.

FIG. 9 illustrates various SSB occasions 900 configured for transmission and measurement of SSBs based on priority levels of IAB-nodes, in accordance with certain aspects of the present disclosure. As illustrated in FIG. 9, there may be four SSB occasions 902, 904, 906, 908. An IAB-node that is priority class 1 (e.g., the highest priority level of priority classes 1-5) may receive an STC for transmission of SSBs in all of the four SSB occasions in order to increase the chances that lower priority IAB-nodes discover the class 1 priority IAB-node and can take interference management actions to reduce interference to the class 1 priority IAB-node. A priority class 2 IAB-node may be configured with STC to transmit SSBs in three of the four SSB occasions 904, 906, 908, and configured with an SMTC to measure SSBs during SSB occasion 902. As illustrated, the lowest priority IAB-node (e.g., priority class 5 IAB-node) may be configured with SMTC to measure SSBs in all the SSB occasions 902, 904, 906, 908.

In certain aspects, a CU may configure an STC window to IAB-node DUs/cells corresponding to one or more priority levels. The CU may configure an SMTC window to an IAB-node MT that may be aligned with the STC window. The IAB-node may infer information about a priority level of an IAB-node DU/cell corresponding to a physical cell identity (PCI) detected by the IAB-node MT within the SMTC window. In other words, if a priority class 5 IAB-node detects SSBs in SSB occasion 902, the IAB-node may know that the SSB is transmitted from a priority class 1

IAB-node since the only IAB-nodes that can be configured to transmit SSBs during the SSB occasion 902 are priority class 1 IAB-nodes. Similarly, an IAB-node that detects an SSB in SSB occasion 904 may know that the SSB is from either a priority class 1 IAB-node or a priority class 2 IAB-node.

In certain aspects, an IAB-node may infer information about a priority level of its own based on receiving STC and/or SMTC configuration(s). That is, the IAB-node may know that a specific configuration for transmission of SSB or measurement of SSB is reserved for a certain priority class of IAB-nodes, and thus, may infer its own priority level accordingly. Similarly, an IAB-node may infer information about a priority level of another node if the IAB-node becomes aware of the STC and/or SMTC configuration(s) of the other node. Once an IAB-node determines its priority level, and/or the priority level of another IAB-node, the IAB-node may perform interference management using the priority level(s). For example, an IAB-node may update a priority level and send an indication of the priority level (e.g., to inform a control node of its priority level or the priority level of another node for interference management). The IAB-node may also modify a transmission (TX) configuration of its DU or a child MT/UE in order to mitigate interference (e.g., reduce TX power if the IAB-node is interfering with a higher priority IAB-node). The IAB-node may send an indication of interference measured by the IAB-node or a child node. For instance, if the IAB-node detects interference from a lower priority IAB-node, the IAB-node detecting the interference may send the indication as complaint of the interference in order for the lower priority node IAB-node to take actions to reduce the interference.

In some implementations, STC configuration of a node may be determined by an entity/party other than a CU. In this case, the CU may determine the SMTC configuration of a node based on the STC configuration of one or more nodes. For instance, the CU may align SMTC window of a low priority node to STC window of a high priority node where the STC window is configured by operations, administration and maintenance (OAM).

Figure 10:
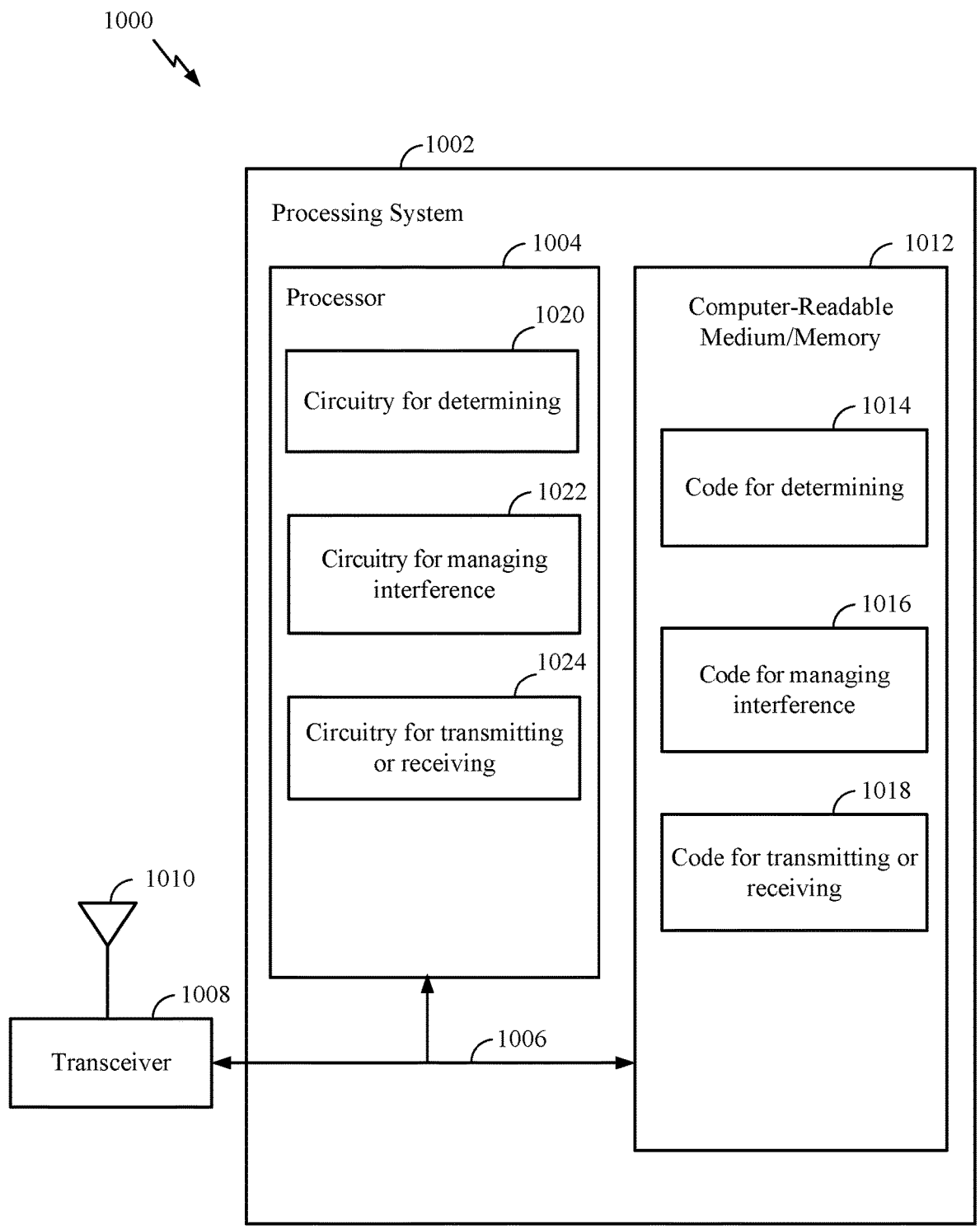
FIG. 10 illustrates a communications device that may include various components configured to perform operations for the techniques disclosed herein in accordance with aspects of the present disclosure.

FIG. 10 illustrates a communications device 1000 that may include various components (e.g., corresponding to means-plus-function components) configured to perform operations for the techniques disclosed herein, such as the operations illustrated in FIGS. 7-8. The communications device 1000 includes a processing system 1002 coupled to a transceiver 1008 (e.g., a transmitter and/or a receiver). The transceiver 1008 is configured to transmit and receive signals for the communications device 1000 via an antenna 1010, such as the various signals as described herein. The transceiver 1008 can, for example, include one or more components of UE 120 with reference to FIG. 2, including, for example, demodulators 254, MIMO detector 256, receive processor 258, transmit processor 264, TX MIMO processor 266, and/or the like. Additionally or alternatively, the transceiver 1008 can, for example, include one or more components of BS 110 with reference to FIG. 2, including, for example, demodulators 232, TX MIMO processor 230, transmit processor 220, MIMO detector 236, receive processor 238, and/or the like. The processing system 1002 may be configured to perform processing functions for the communications device 1000, including processing signals received and/or to be transmitted by the communications device 1000.

The processing system 1002 includes a processor 1004 coupled to a computer-readable medium/memory 1012 via a bus 1006. In certain aspects, the computer-readable medium/memory 1012 is configured to store instructions (e.g., computer-executable code) that when executed by the processor 1004, cause the processor 1004 to perform the operations illustrated in FIGS. 7-9, or other operations for performing the various techniques discussed herein for interference management in an IAB network. In certain aspects, computer-readable medium/memory 1012 stores code 1014 for determining (e.g., determining at least one configuration for communication of SSBs); code 1016 for managing interference; and code 1018 for transmitting or receiving (e.g., transmitting or receiving at least one configuration). In certain aspects, the processor 1004 has circuitry configured to implement the code stored in the computer-readable medium/memory 1012. The processor 1004 includes circuitry 1020 for determining (e.g., determining at least one configuration for communication of SSBs); circuitry 1022 for managing interference; and circuitry 1024 for transmitting or receiving (e.g., transmitting or receiving at least one configuration).

For example, means for transmitting (or means for outputting for transmission) may include a transmitter and/or an antenna(s) 234 of the BS 110 or transmitter and/or antenna(s) 252 of the UE 120 illustrated in FIG. 2 and/or circuitry 1024 and/or transceiver 1008 of the communication device 1000 in FIG. 10. Means for receiving (or means for obtaining) may include a receiver and/or an antenna(s) 234 of the BS 110 or a receiver and/or antenna(s) 252 of the UE 120 illustrated in FIG. 2 and/or circuitry 1024 and/or transceiver 1008 of the communication device 1000 in FIG. 10. Means for determining and means for taking one or more actions may include a processing system, which may include one or more processors, such as the transmit processor 220, the TX MIMO processor 230, the receive processor 238, and/or the controller/processor 240 of the BS 110 or the receive processor 258, the transmit processor 264, the TX MIMO processor 266, and/or the controller/processor 280 of the UE 120a illustrated in FIG. 2 and/or the processing system 1002 of the communication device 1000 in FIG. 10.

Example Aspects

Aspect 1. A method for wireless communication, comprising: determining, based on a priority level associated with each of a first wireless node, a second wireless node, or both, at least one configuration for communicating one or more synchronization signal blocks (SSBs) between the first wireless node and the second wireless node, each of the first wireless node and the second wireless node being configured to serve one or more child nodes, wherein the at least one configuration comprises information enabling the first wireless node or the second wireless node to manage interference to communications; and transmitting the at least one configuration to at least one of the first wireless node or the second wireless node.

Aspect 2. The method of aspect 1, wherein the at least one configuration indicates a cell identifier (ID) to be measured by the first wireless node based on the one or more SSBs, the cell ID being associated with the second wireless node if the priority level of the second wireless node is greater than the priority level of the first wireless node.

Aspect 3. The method of any one of aspects 1-2, wherein the at least one configuration indicates, to the first wireless node, to measure the one or more SSBs transmitted by the second wireless node if the priority level of the second wireless node is greater than the priority level of the first wireless node.

Aspect 4. The method of any one of aspects 1-3, wherein the at least one configuration configures a periodicity of transmission of the one or more SSBs by the first wireless node based on a policy that the periodicity decreases as the priority level associated with the first wireless node increases.

Aspect 5. The method of any one of aspects 1-4, wherein the at least one configuration configures a periodicity of measurement of the one or more SSBs by the second wireless node based on a policy that the periodicity decreases as the priority level associated with the second wireless node decreases.

Aspect 6. The method of any one of aspects 1-5, wherein the at least one configuration aligns a window for measurement of the one or more SSBs by the first wireless node and a transmission of the one or more SSBs by the second wireless node if the priority level of the second wireless node is greater than the first wireless node.

Aspect 7. The method of any one of aspects 1-6, wherein the at least one configuration sets a configuration for measurement of the one or more SSBs by the first wireless node to be equal to a configuration for transmission of the one or more SSBs by the second wireless node if the priority level of the second wireless node is greater than the first wireless node.

Aspect 8. The method of any one of aspects 1-7, wherein the at least one configuration: configures a duration of a window for measurement of the one or more SSBs by the first wireless node based on a policy that the duration of the window decreases as the priority level associated with the first wireless node increases; sets a window for measurement of the one or more SSBs by the first wireless node and a transmission of the one or more SSBs by the second wireless node to be non-overlapping if the priority level of the second wireless node is less than the first wireless node; sets a quantity of the one or more SSBs to be transmitted by the second wireless node during a unit of time based on a policy that the quantity increases as the priority level of the second wireless node increases; sets a quantity of one or more windows for measurement of the one or more SSBs by the first wireless node based on a policy that the quantity of one or more windows decreases as the priority level of the first wireless node increases; sets a quantity of one or more windows for transmission of the one or more SSBs by the second wireless node based on a policy that the quantity of one or more windows for transmission increases as the priority level of the second wireless node increases; or any combination thereof.

Aspect 9. The method of any one of aspects 1-8, wherein the first wireless node is associated with a plurality of priority levels, and wherein the at least one configuration comprises a configuration associated with each of the plurality of priority level.

Aspect 10. The method of any one of aspects 1-9, further comprising detecting a potential for the interference to be caused by the communications of the first wireless node to the communications by the second wireless node, wherein the at least one configuration comprises at least one of: a configuration for the second wireless node to detect the first wireless node; a configuration for the first wireless node to detect the second wireless node; or a configuration for at least one of the first wireless node or the second wireless node to detect the interference.

Aspect 11. The method of aspect 10, wherein the detection of the potential for the interference is in response to at least one of: one or more parameters of a measurement report; or an indication of the interference from the second wireless node.

Aspect 12. The method of any one of aspects 1-11, wherein the configuration comprises an SSB measurement time configuration (SMTC) for at least one measurement to be performed based on the one or more SSBs.

Aspect 13. The method of aspect 12, wherein the SMTC comprises a center frequency associated with the one or more SSBs, a subcarrier spacing associated with the one or more SSBs, periodicity of a window during which the measurement is performed, a timing offset associated with the window during which the measurement is performed, a duration of the window during which the measurement is performed, a list of one or more cell IDs to be measured, a list of the one or more SSBs to be measured, or any combination thereof.

Aspect 14. The method of any one of aspects 1-11, wherein the configuration comprises an SSB transmission configuration (STC) for transmission of the one or more SSBs, wherein the STC comprises a center frequency associated with the one or more SSBs, a subcarrier spacing associated with the one or more SSBs, periodicity of the transmission of the one or more SSBs, a timing offset associated with the transmission of the one or more SSBs, at least one index associated with the one or more SSBs to be transmitted, or any combination thereof.

Aspect 15. The method of any one of aspects 1-14, wherein the first wireless node and the second wireless node are nodes of an Integrated Access and Backhaul network (IAB) network, the method being performed by a central unit (CU) of the IAB-network.

Aspect 16. A method for wireless communication, comprising: receiving, at a first wireless node, at least one configuration for communicating of one or more synchronization signal blocks (SSBs) between the first wireless node and a second wireless node, each of the first wireless node and the second wireless node being configured to serve one or more child nodes; and managing interference to communications via the one or more SSBs based on at least one priority level associated with the first wireless node, the second wireless node, or both, the communications being by the first wireless node or the second wireless node.

Aspect 17. The method of aspect 16, wherein the at least one priority level associated with the first wireless node comprises a plurality of priority levels, and wherein the at least one configuration for the communicating of the one or more SSBs by the first wireless node comprises a configuration associated with each of the plurality of priority levels.

Aspect 18. The method of any one of aspects 16-17, further comprising inferring the at least one priority level associated with the first wireless node, the second wireless node, or both based on the at least one configuration.

Aspect 19. The method of aspect 18, wherein the inferring the at least one priority level comprises inferring a priority level of the first wireless node based on the configuration for the communicating of the one or more SSBs by the first wireless node.

Aspect 20. The method of any one of aspects 18-19, wherein the inferring the at least one priority level comprises inferring a priority level of the second wireless node based on the configuration for the communicating of the one or more SSBs by the second wireless node.

Aspect 21. The method of any one of aspects 16-20, further comprising inferring the at least one priority level of the second wireless node based on detection of the one or more SSBs transmitted by the second wireless node during an SSB occasion that is configured for SSB transmissions by nodes having the at least one priority level.

Aspect 22. The method of any one of aspects 16-21, wherein the at least one configuration comprises an SSB measurement time configuration (SMTC) for at least one measurement performed based on the one or more SSBs.

Aspect 23. The method of aspect 22, wherein the SMTC comprises a center frequency associated with the one or more SSBs, a subcarrier spacing associated with the one or more SSBs, periodicity of a window during which the measurement is performed, a timing offset associated with the window during which the measurement is performed, a duration of the window during which the measurement is performed, a list of one or more cell IDs to be measured, a list of the one or more SSBs to be measured, or any combination thereof.

Aspect 24. The method of any one of aspects 16-23, wherein the at least one configuration comprises an SSB transmission configuration (STC) for transmission of the one or more SSBs, wherein the STC comprises a center frequency associated with the one or more SSBs, a subcarrier spacing associated with the one or more SSBs, periodicity of the transmission of the one or more SSBs, a timing offset associated with the transmission of the one or more SSBs, at least one index associated with the one or more SSBs to be transmitted, or any combination thereof.

Aspect 25. The method of any one of aspects 16-24, wherein the first wireless node and the second wireless node are nodes of an Integrated Access and Backhaul network (IAB) network.

The techniques described herein may be used for various wireless communication technologies, such as 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably.

A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), Institute of Electrical and Electronics Engineers (IEEE) 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2).

The techniques described herein may be used for the wireless networks and radio technologies mentioned above as well as other wireless networks and radio technologies. For clarity, while aspects may be described herein using terminology commonly associated with 3G, 4G, and/or 5G wireless technologies, aspects of the present disclosure can be applied in other generation-based communication systems.

New Radio (NR) is an emerging wireless communications technology under development in conjunction with the 5G Technology Forum (5GTF). NR access (e.g., 5G NR) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission communications critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC- FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.8 MHz (e.g., 6 RBs), and there may be 1, 2, 4, 8, or 16 subbands for system bandwidth of 1.25, 2.5, 5, 10 or 20 MHz, respectively. In LTE, the basic transmission time interval (TTI) or packet duration is the 1 ms subframe.

NR may utilize OFDM with a CP on the uplink and downlink and include support for half-duplex operation using time-division duplexing (TDD). In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing. Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In some examples, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system. For example, in some cases, processors such as those shown in FIG. 2 may be configured to perform operations 700 of FIG. 7 and/or operations 800 of FIG. 8.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIGS. 7-9.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communication, comprising:
   determining, based on a priority level for a first wireless node, a priority level for a second wireless node, or both of the priority level for the first wireless node and the priority level for the second wireless node, at least one configuration for communicating one or more synchronization signal blocks (SSBs) between the first wireless node and the second wireless node, each of the first wireless node and the second wireless node being configured to serve one or more child nodes, wherein the at least one configuration comprises information enabling the first wireless node or the second wireless node to manage interference to communications; and
   transmitting the at least one configuration to at least one of the first wireless node or the second wireless node,
   wherein each of the priority level for the first wireless node and the priority level for the second wireless node corresponds to one of a plurality of priority levels, wherein the plurality of priority levels comprises three or more priority levels.

2. The method of claim 1, wherein the at least one configuration indicates a cell identifier (ID) to be measured by the first wireless node based on the one or more SSBs, the cell ID being associated with the second wireless node if the priority level for the second wireless node is greater than the priority level the first wireless node.

3. The method of claim 1, wherein the at least one configuration indicates, to the first wireless node, to measure the one or more SSBs transmitted by the second wireless node when the priority level for the second wireless node is greater than the priority level for the first wireless node.

4. The method of claim 1, wherein the at least one configuration configures a periodicity of transmission of the one or more SSBs by the first wireless node based on a policy that the periodicity decreases as the priority level for the first wireless node increases.

5. The method of claim 1, wherein the at least one configuration configures a periodicity of measurement of the one or more SSBs by the second wireless node based on a policy that the periodicity decreases as the priority level for the second wireless node decreases.

6. The method of claim 1, wherein the at least one configuration aligns a window for measurement of the one or more SSBs by the first wireless node and a transmission of the one or more SSBs by the second wireless node when the priority level for the second wireless node is greater than the priority level for the first wireless node.

7. The method of claim 1, wherein the at least one configuration sets a configuration for measurement of the one or more SSBs by the first wireless node to be equal to a configuration for transmission of the one or more SSBs by the second wireless node when the priority level for the second wireless node is greater than the priority level for the first wireless node.

8. The method of claim 1, wherein the at least one configuration:
   configures a duration of a window for measurement of the one or more SSBs by the first wireless node based on a policy that the duration of the window decreases as the priority level for the first wireless node increases;
   sets a window for measurement of the one or more SSBs by the first wireless node and a transmission of the one or more SSBs by the second wireless node to be non-overlapping when the priority level for the second wireless node is less than the priority level for the first wireless node;
   sets a quantity of the one or more SSBs to be transmitted by the second wireless node during a unit of time based on a policy that the quantity increases as the priority level for the second wireless node increases;
   sets a quantity of one or more windows for measurement of the one or more SSBs by the first wireless node based on a policy that the quantity of one or more windows decreases as the priority level for the first wireless node increases;
   sets a quantity of one or more windows for transmission of the one or more SSBs by the second wireless node based on a policy that the quantity of one or more windows for transmission increases as the priority level for the second wireless node increases; or
   any combination thereof.

9. The method of claim 1, wherein:
   the priority level of the first wireless node and the priority level of the second wireless node are different; and
   the determining the at least one configuration comprises:
      determining the at least one configuration comprises a first configuration when the determining the at least one configuration is based on the priority level of the first wireless node; and
      determining the at least one configuration comprises a second configuration when the determining the at least one configuration is based on the priority level of the second wireless node, wherein the first configuration and the second configuration are different.

10. The method of claim 1, further comprising detecting a potential for the interference to be caused by the communications of the first wireless node to the communications by the second wireless node, wherein the at least one configuration comprises at least one of:
    a configuration for the second wireless node to detect the first wireless node;
    a configuration for the first wireless node to detect the second wireless node; or
    a configuration for at least one of the first wireless node or the second wireless node to detect the interference.

11. The method of claim 10, wherein the detection of the potential for the interference is in response to at least one of:
    one or more parameters of a measurement report; or
    an indication of the interference from the second wireless node.

12. The method of claim 1, wherein the configuration comprises an SSB measurement time configuration (SMTC) for at least one measurement to be performed based on the one or more SSBs.

13. The method of claim 12, wherein the SMTC comprises a center frequency associated with the one or more SSBs, a subcarrier spacing associated with the one or more SSBs, periodicity of a window during which the measurement is performed, a timing offset associated with the window during which the measurement is performed, a duration of the window during which the measurement is performed, a list of one or more cell IDs to be measured, a list of the one or more SSBs to be measured, or any combination thereof.

14. The method of claim 1, wherein the configuration comprises an SSB transmission configuration (STC) for transmission of the one or more SSBs, wherein the STC comprises a center frequency associated with the one or more SSBs, a subcarrier spacing associated with the one or more SSBs, periodicity of the transmission of the one or more SSBs, a timing offset associated with the transmission of the one or more SSBs, at least one index associated with the one or more SSBs to be transmitted, or any combination thereof.

15. The method of claim 1, wherein the first wireless node and the second wireless node are nodes of an Integrated Access and Backhaul network (IAB) network, the method being performed by a central unit (CU) of the IAB-network.

16. A method for wireless communication, comprising:
receiving, at a first wireless node, at least one configuration for communicating of one or more synchronization signal blocks (SSBs) between the first wireless node and a second wireless node, each of the first wireless node and the second wireless node being configured to serve one or more child nodes; and
managing interference to communications via the one or more SSBs based on a priority level for the first wireless node, a priority level for the second wireless node, or both of the priority level for the first wireless node and the priority level for the second wireless node, the communications being by the first wireless node or the second wireless node,
wherein each of the priority level for the first wireless node and the priority level for the second wireless node corresponds to one of a plurality of priority levels, wherein the plurality of priority levels comprises three or more priority levels.

17. The method of claim 16, wherein:
the priority level of the first wireless node and the priority level of the second wireless node are different; and
the receiving the at least one configuration comprises:
receiving a first configuration when the at least one configuration is based on the priority level of the first wireless node; and
receiving a second configuration when the at least one configuration is based on the priority level of the second wireless node, wherein the first configuration and the second configuration are different.

18. The method of claim 16, further comprising inferring the priority level for the first wireless node, the priority level for the second wireless node, or both of the priority level for the first wireless node and the priority level for the second wireless node based on the at least one configuration.

19. The method of claim 18, wherein the inferring comprises inferring the priority level for the first wireless node based on the at least one configuration comprising a configuration for the communicating of the one or more SSBs by the first wireless node.

20. The method of claim 18, wherein the comprises inferring the priority level for the second wireless node based on the at least one configuration comprising a configuration for the communicating of the one or more SSBs by the second wireless node.

21. The method of claim 16, further comprising inferring the priority level for the second wireless node corresponds to a given priority level of the plurality of priority levels based on detection of the one or more SSBs transmitted by the second wireless node during an SSB occasion that is configured for SSB transmissions by nodes having the given priority level.

22. The method of claim 16, wherein the at least one configuration comprises an SSB measurement time configuration (SMTC) for at least one measurement performed based on the one or more SSBs.

23. The method of claim 22, wherein the SMTC comprises a center frequency associated with the one or more SSBs, a subcarrier spacing associated with the one or more SSBs, periodicity of a window during which the measurement is performed, a timing offset associated with the window during which the measurement is performed, a duration of the window during which the measurement is performed, a list of one or more cell IDs to be measured, a list of the one or more SSBs to be measured, or any combination thereof.

24. The method of claim 16, wherein the at least one configuration comprises an SSB transmission configuration (STC) for transmission of the one or more SSBs, wherein the STC comprises a center frequency associated with the one or more SSBs, a subcarrier spacing associated with the one or more SSBs, periodicity of the transmission of the one or more SSBs, a timing offset associated with the transmission of the one or more SSBs, at least one index associated with the one or more SSBs to be transmitted, or any combination thereof.

25. The method of claim 16, wherein the first wireless node and the second wireless node are nodes of an Integrated Access and Backhaul network (IAB) network.

26. An apparatus for wireless communication, comprising:
a processing system configured to determine, based on a priority level for a first wireless node, a priority level for a second wireless node, or both of the priority level for the first wireless node and the priority level for the second wireless node, at least one configuration for communicating one or more synchronization signal blocks (SSBs) between the first wireless node and the second wireless node, each of the first wireless node and the second wireless node being configured to serve one or more child nodes, wherein the at least one configuration comprises information enabling the first wireless node or the second wireless node to manage interference to communications; and
a transmitter configured to transmit the at least one configuration to at least one of the first wireless node or the second wireless node,
wherein each of the priority level for the first wireless node and the priority level for the second wireless node corresponds to one of a plurality of priority levels, wherein the plurality of priority levels comprises three or more priority levels.

27. The apparatus of claim 26, wherein the first wireless node and the second wireless node are nodes of an Integrated Access and Backhaul network (IAB) network.

28. An apparatus for wireless communication, comprising:
a receiver configured to receive, at a first wireless node, at least one configuration for communicating of one or more synchronization signal blocks (SSBs) between the first wireless node and a second wireless node, each of the first wireless node and the second wireless node being configured to serve one or more child nodes; and
a processing system configured to manage interference to communications via the one or more SSBs based on a priority level for the first wireless node, a priority level for the second wireless node, or both of the priority level for the first wireless node and the priority level for the second wireless node, the communications being by the first wireless node or the second wireless node, wherein each of the priority level for the first wireless node and the priority level for the second wireless node corresponds to one of a plurality of priority levels, wherein the plurality of priority levels comprises three or more priority levels.

29. The apparatus of claim 28, wherein the first wireless node and the second wireless node are nodes of an Integrated Access and Backhaul network (IAB) network.

\* \* \* \* \*